US008099465B2

(12) United States Patent
Daniels et al.

(10) Patent No.: US 8,099,465 B2
(45) Date of Patent: Jan. 17, 2012

(54) METHOD AND SYSTEM FOR PREPARING AND REPLYING TO MULTI-PARTY E-MAILS

(75) Inventors: Fonda J. Daniels, Cary, NC (US);
Ruthie D. Lyle, Durham, NC (US);
Kelly Malone, Poughkeepsie, NY (US);
Demethria J. Ramseur, Smyrna, GA (US)

(73) Assignee: International Business Machines Corporation, Armonk, NY (US)

( * ) Notice: Subject to any disclaimer, the term of this patent is extended or adjusted under 35 U.S.C. 154(b) by 978 days.

(21) Appl. No.: 11/147,548

(22) Filed: Jun. 7, 2005

(65) Prior Publication Data
US 2006/0277263 A1 Dec. 7, 2006

(51) Int. Cl.
*G06F 13/00* (2006.01)
(52) U.S. Cl. ...................................................... 709/206
(58) Field of Classification Search ................... 709/206
See application file for complete search history.

(56) References Cited

U.S. PATENT DOCUMENTS

| | | | |
|---|---|---|---|
| 5,872,925 A * | 2/1999 | Han | 709/206 |
| 6,311,211 B1 * | 10/2001 | Shaw et al. | 709/206 |
| 6,360,251 B1 | 3/2002 | Fujita et al. | |
| 6,618,748 B1 | 9/2003 | Bates et al. | |
| 6,816,887 B1 * | 11/2004 | Shaw et al. | 709/207 |
| 7,130,887 B2 * | 10/2006 | Goldberg | 709/206 |
| 7,219,129 B2 * | 5/2007 | Weissman | 709/206 |
| 2002/0019852 A1 | 2/2002 | Bahar | |
| 2002/0083196 A1 | 6/2002 | Moyers | |
| 2002/0107930 A1 * | 8/2002 | Itoh | 709/206 |
| 2002/0120700 A1 | 8/2002 | Tamura | |
| 2002/0120701 A1 | 8/2002 | Ohba | |
| 2002/0143881 A1 | 10/2002 | DeLaCruz | |
| 2003/0233421 A1 | 12/2003 | Shibata et al. | |
| 2004/0025057 A1 | 2/2004 | Cook | |
| 2004/0073616 A1 | 4/2004 | Fellenstein et al. | |
| 2004/0078488 A1 | 4/2004 | Patrick | |
| 2004/0205205 A1 | 10/2004 | Patterson | |
| 2005/0108351 A1 * | 5/2005 | Naick et al. | 709/207 |
| 2006/0026238 A1 * | 2/2006 | Schwarz | 709/206 |
| 2006/0206572 A1 * | 9/2006 | Lalonde et al. | 709/206 |
| 2007/0011245 A1 * | 1/2007 | Kawashima et al. | 709/206 |
| 2007/0016647 A1 * | 1/2007 | Gupta et al. | 709/206 |
| 2007/0143407 A1 * | 6/2007 | Avritch et al. | 709/206 |
| 2007/0294358 A1 * | 12/2007 | Kelley et al. | 709/206 |

OTHER PUBLICATIONS

Microsoft Office Outlook 2003 Step by Step, Aug. 27, 2003.*
Microsoft Outlook 2003.*

* cited by examiner

*Primary Examiner* — Robert B Harrell
(74) *Attorney, Agent, or Firm* — Schmeiser, Olsen & Watts; Anna Linne

(57) ABSTRACT

A method for preparing and replying to multi-party e-mails is provided. The method includes opening an e-mail composition window in an e-mail application for generating an e-mail, specifying one or more recipients from a plurality of recipient groups for the e-mail, creating one or more response sections, identifying at least one recipient for each of the response sections, and sending the e-mail. The creating step further includes creating a general section in the e-mail. The method further includes selecting a delivery option from a plurality of delivery options for the e-mail prior to sending the e-mail and receiving one or more return receipts based on the delivery option selected in the e-mail sent. The method further includes selecting a response section in a received e-mail, and generating a reply to the response section in a reply e-mail composition window containing the response section.

19 Claims, 11 Drawing Sheets

METHOD AND SYSTEM FOR PREPARING AND REPLYING TO MULTI-PARTY E-MAILS

FIELD OF THE INVENTION

The present invention relates to the field of electronic mail (e-mail) communications and, more particularly, the invention relates to a method for preparing and replying to multi-party e-mails.

BACKGROUND OF THE INVENTION

In today's business environment, organizations and/or businesses utilize electronic mail (e-mail) to communicate both internally within the organizations and/or businesses and externally with other organizations and/or businesses. Often, e-mail messages are addressed to more than one recipient and often, based on the importance of the e-mail, the sender of the e-mail requires confirmation that the e-mail was delivered to the recipients. Furthermore, given that in today's business environment, business inquiries or concerns frequently are handled using e-mail, a sender of an e-mail, often expects one or more recipients of the e-mail to provide an answer/response to the e-mail. As such, it has become imperative that organizations and/or businesses examine the efficiency and effectiveness of e-mail communication systems employed as far as the resources consumed, such as, storage and/or memory required as well as time spent by personnel within these organizations and/or businesses in sending, receiving and/or responding to such e-mails.

SUMMARY OF THE INVENTION

In an aspect of the invention, there is provided a method of preparing an e-mail. The method comprises opening an e-mail composition window in an e-mail application for generating a new e-mail, specifying one or more recipients from a plurality of recipient groups for the new e-mail, creating one or more response sections in the new e-mail, identifying at least one recipient for each of the response sections, and sending the new e-mail. Preferably, the plurality of recipient groups comprises at least one of: To, cc and bcc. The creating step further comprises creating a general section in the new e-mail. In an embodiment, the method further comprises selecting a delivery option from a plurality of delivery options for the new e-mail prior to sending the new e-mail. Further, the method comprises receiving one or more return receipts based on the delivery option selected in the new e-mail sent. Preferably, the plurality of delivery options comprises at least one of: Return Receipt To, Return Receipt cc and Return Receipt bcc.

In another aspect of the invention, there is provided a method of responding to a received e-mail having a plurality of distinct sections. The method comprises opening the received e-mail in an e-mail application, selecting a distinct section from the plurality of distinct sections in the received e-mail to respond to, generating a reply e-mail to the distinct section selected in a reply e-mail composition window containing only the distinct section selected, and sending the reply e-mail. Preferably, the plurality of distinct sections comprises at least one of: general section and response section. The generating step further includes choosing a reply option for the distinct section selected in the received e-mail. In one embodiment, the distinct section selected is a general section and the generating step further comprises generating a reply e-mail to the general section selected in the reply e-mail composition window containing only the general section selected. In another embodiment, the distinct section selected is a response section and the generating step further comprises generating a reply e-mail to the response section selected in the reply e-mail composition window containing only the response section selected. Further, the sending step further includes selecting a delivery option from a plurality of delivery options for the reply e-mail prior to sending the reply e-mail. In an embodiment, the method further comprises receiving one or more return receipts based on the delivery option selected in the reply e-mail. Preferably, the reply option comprises at least one of: Reply and Reply All. Further, the delivery option comprises at least one of: Return Receipt To, Return Receipt cc and Return Receipt bcc.

In yet another embodiment of the invention, there is provided a method of requesting a return receipt from a subset of recipients of an e-mail. The method comprises creating an e-mail in an e-mail composition window of an e-mail application, specifying recipients from a plurality of recipient groups for the e-mail, selecting one or more return receipt recipients from a plurality of return receipt recipient groups for the e-mail, the one or more return receipt recipients selected corresponding to the subset of recipients, and sending the e-mail to the recipients specified in the e-mail, such that, the return receipt is requested from the one or more return receipt recipients selected and corresponding to the subset of recipients of the e-mail. Preferably, the plurality of recipient groups comprises at least one of: To, cc and bcc, and wherein the plurality of return receipt recipient groups comprises at least one of: Return Receipt To, Return Receipt cc and Return Receipt bcc.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Figure 1:
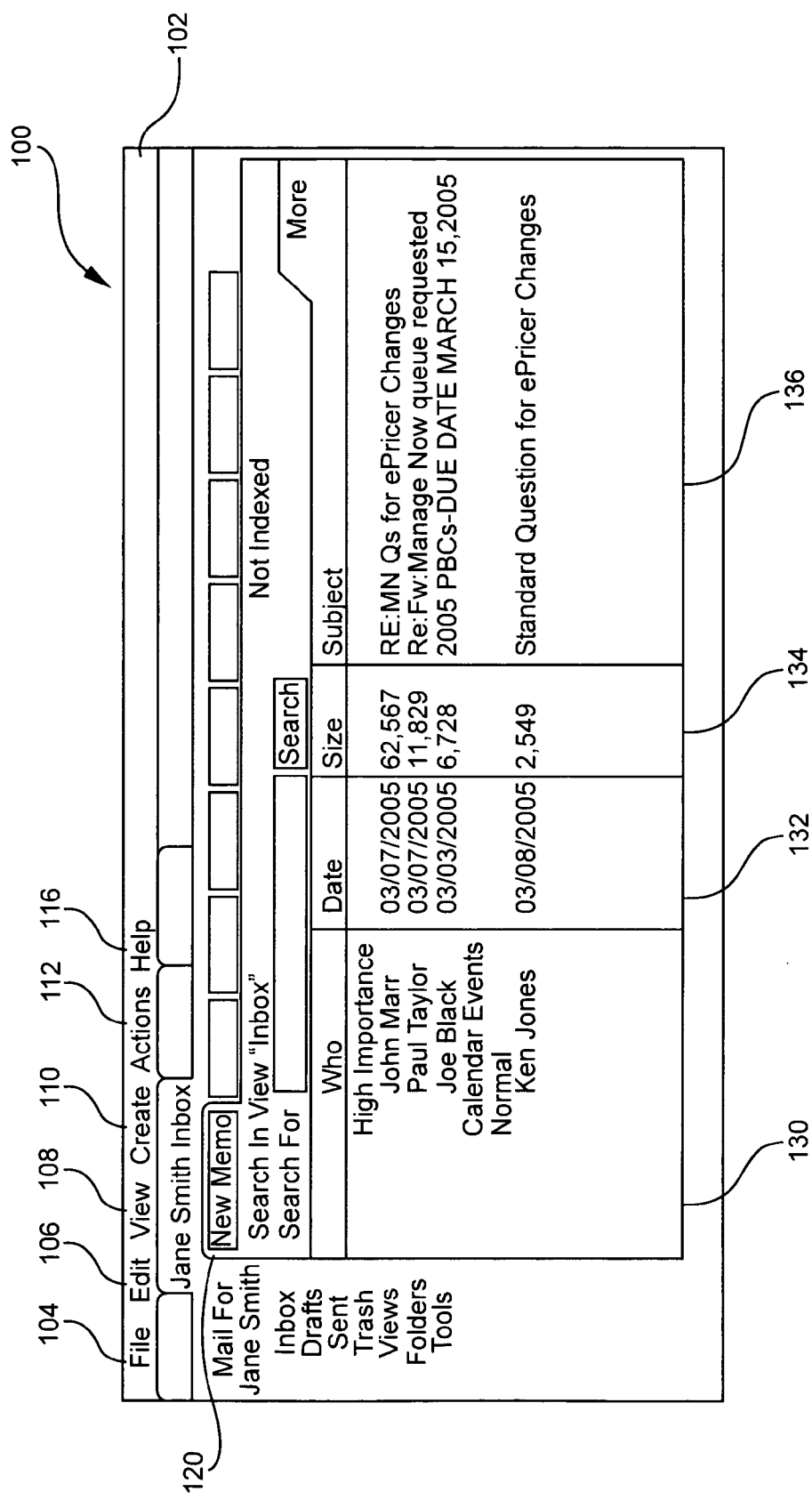
FIG. 1 is an illustration of an inbox window or screen in an e-mail application, in accordance with an embodiment of the present invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the invention provides a method of preparing an e-mail. The method comprises opening an e-mail composition window in an e-mail application for generating a new e-mail and specifying one or more recipients from a plurality of recipient groups for the new e-mail. Preferably, the plurality of recipient groups comprises at least one of: To, cc and bcc. The method further comprises creating one or more response sections in the new e-mail. Preferably, the creating step further comprises creating a general section in the new e-mail in addition to one or more response sections created in the new e-mail. Further, the method comprises identifying at least one recipient for each of the response sections created, and sending the new e-mail generated to the specified recipients. Moreover, the method further comprises selecting a delivery option from a plurality of delivery options for the new e-mail prior to sending the new e-mail. The method further comprises receiving one or more return receipts based on the delivery option selected in the new e-mail sent. Preferably, the delivery option comprises at least one of: Return Receipt To, Return Receipt cc and Return Receipt bcc.

As used herein, the term "e-mail" refers to an electronic mail composed using any e-mail application program, preferably, a commercially available e-mail application program, such as, the Lotus Notes® e-mail application program that is commercially available from International Business Machines (IBM). Further, as used herein, the term "preparing" is intended to refer to the multitude of tasks involved in creating, generating, or composing an e-mail, in particular, a multi-party e-mail having multiple recipients. For instance, the term "preparing" is intended to include tasks such as composing different sections, such as, a general section and one or more response sections in an e-mail, means of specifying recipients to whom an e-mail is sent, such as, individuals or categorizing individuals by groups so that an e-mail can be sent to a group, specifying or identifying recipients for a particular response section or sections in an e-mail, and specifying delivery options, such as, return receipts for an e-mail.

As used herein, the term "recipient" is intended to refer to any recipient or party specified or identified in the e-mail, for instance, a recipient identified in a To, cc and/or bcc section of an e-mail and/or a recipient who receives an e-mail. Further, the term "recipient" is intended to include both an individual recipient as well as a group of individuals that are categorized together as one recipient. For instance, a group_1 recipient can include individuals A, B and C. Also, as used herein the term "multi-party" or "multiple recipients" is intended to refer to an e-mail that has more than one recipient in the overall e-mail, regardless of how the party or recipient has been labeled in the e-mail, that is, regardless of whether the recipient is a To recipient, a cc recipient, a bcc recipient, etc. As used herein, the term "primary recipient" or "primary recipients" is intended to refer to the recipient or recipients specified in the To recipient group or section of an e-mail. Further, the term "secondary recipient" or "secondary recipients" or "non-primary recipient" or "non-primary recipients" is intended to refer to the recipient or recipients specified in either the cc or bcc recipient groups or sections of an e-mail. Also, as used herein, the term "new e-mail" or "original e-mail" is intended to refer to an e-mail that is created in an e-mail application versus a "reply e-mail", which is an e-mail that is in response to a new email or original e-mail received. Furthermore, the term "user" is intended to refer to any person or party that uses an e-mail application program to create an e-mail or reply to an e-mail. However, the term "original user" or "originator" is intended to refer to a user that creates a new or original e-mail, whereas, the term "replier" or "responder" or "reply user" is intended to refer to a user that responds to an original or new e-mail. Also, as used herein, the term "distinct sections" is used to refer to an e-mail containing one or more separately identified response sections or an e-mail containing a general section and one or more separately identified response sections. Further, the term "general section" refers to a message in a new or original e-mail that is intended for all recipients specified in an e-mail, whereas, the term "response section" refers to a message in a new or original e-mail that is specified or identified for a subset of recipients (where subset is intended to refer to one or more or all of the recipients) specified in an e-mail. Furthermore, the term "general section recipient" or "non-response section recipient" refers to a recipient who is not specified in any response section, such that, the recipient does not have any response section to which the recipient can reply to in a received e-mail. The term "response section recipient" refers to a recipient who is specified in a response section of a received e-mail, such that, the recipient can reply to the response section in a received e-mail.

Reference is now made to FIGS. 1 through 9, which illustrate a method of preparing an e-mail, in accordance with an embodiment of the invention. Turning to FIG. 1, numeral 100 refers to the illustration of an inbox window or screen for Jane Smith in an e-mail application. The inbox window 100 shows a main menu bar 102 at the top that contains the main menu items File 104, Edit 106, View 108, Create 110, Actions 112 and Help 116. Further, the inbox window 100 displays the e-mails received in the inbox, which preferably are arranged in some sort of order of importance. In particular, the inbox shows the name of the person or persons who sent the e-mail in the Who column 130, the date the e-mail was sent in the Date column 132, the size of the e-mail in the Size column 134 and the subject of the e-mail in the Subject column 136. As shown in the Who column 130, the inbox messages have been sorted with the High Importance e-mails shown at the top and the Normal e-mails shown toward the bottom of the screen 100. Although the e-mails have been arranged in this manner, a user can choose to arrange the inbox in various other arrangements.

When an original user wants to create a new or original e-mail, the originator clicks or presses on the New Memo tab or button 120 shown in FIG. 100. Clicking or pressing on the e-mail button 120 takes a user to an e-mail composition window 200 shown in FIG. 2. The e-mail composition window has a menu bar 202 at the top that contains the menu items File 204, Edit 206, View 208, Create 210, Actions 212, Text 213 and Help 216. The originator specifies for the new e-mail one or more recipients from a plurality of recipient groups in the e-mail composition window 200. In a preferred embodiment, the plurality of recipient groups comprises a To recipient group (which specifies one or more primary recipients that the e-mail is intended for), a cc recipient group (which specifies one or more carbon copy recipients or non-primary or secondary recipients) and a bcc recipient group (which specifies one or more blind carbon copy recipients or non-primary or secondary recipients). Preferably, an e-mail application is linked to a database, such that, when a user enters a name or e-mail address in the recipient group field, the e-mail application can access and scan the database to match the name and/or e-mail address entered, so that the e-mail is addressed and sent to the intended recipient.

Figure 2:
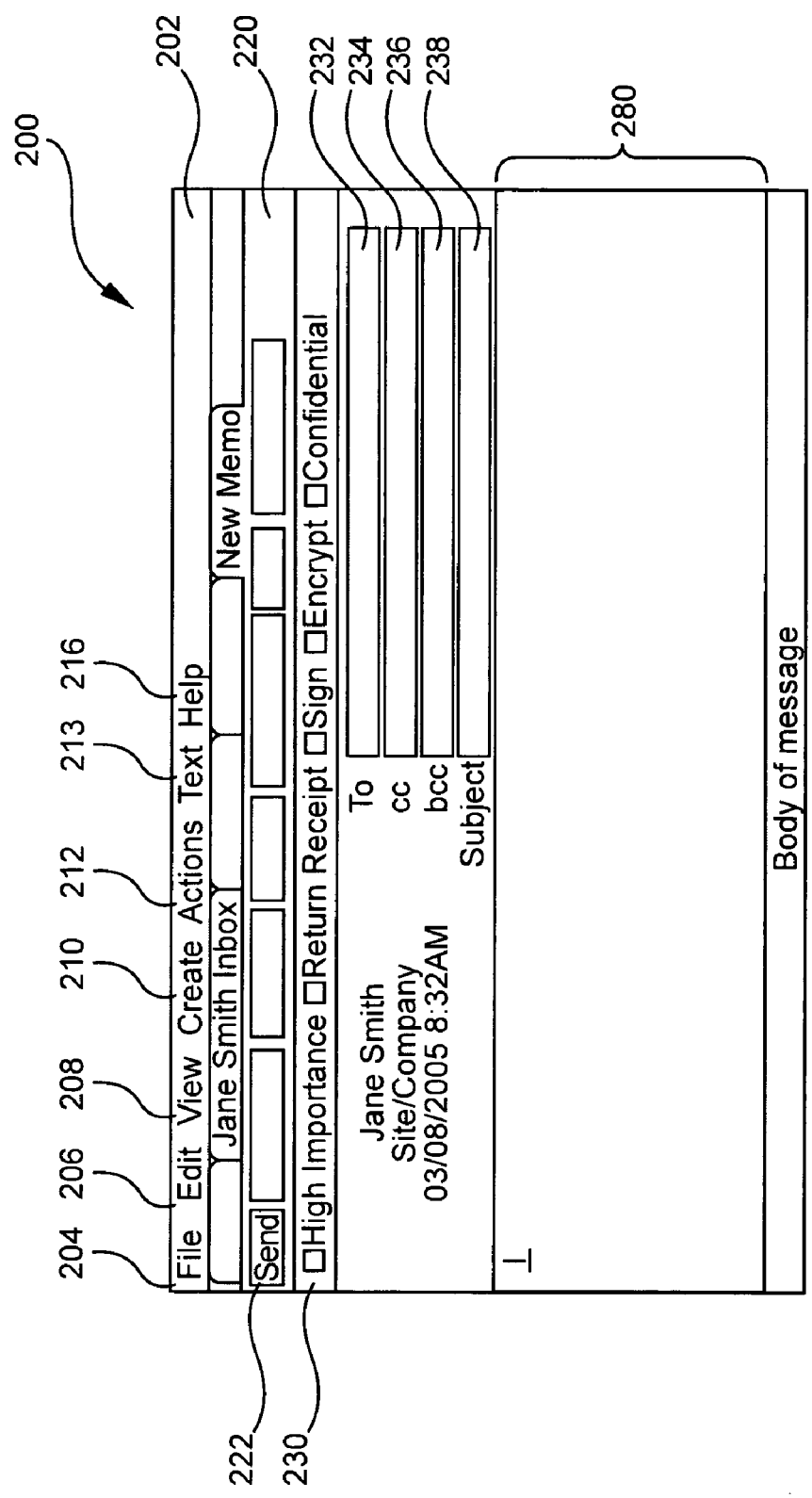
FIG. 2 is an illustration of a new e-mail composition window or screen in an e-mail application, in accordance with an embodiment of the present invention.

Referring to FIG. 2, the originator can specify one or more recipients in the To recipient group 232, one or more recipients in the cc recipient group 234, as well as one or more recipients in the bcc recipient group 236. Alternatively, the originator can specify recipients in only one of the three recipient groups (To recipient group 232, the cc recipient group 234 and the bcc recipient group 236) or alternatively, the originator can specify recipients in two of the three recipient groups 232, 234 and 236. The originator can specify recipients that are individuals or specify recipients that are groups, where a group is made of two or more individuals (as will be discussed with reference to FIG. 3). In addition, the originator preferably, enters a subject or title in the Subject field 238. The e-mail composition window 200 further shows an action menu bar 220 towards the top of the composition window 200, which shows, in particular, the action item button Send 222 on the left side of the action menu bar 220, but also shows other action item buttons next to the Send 222 button, which are not marked in FIG. 200. Further, the composition window 200 shows a delivery options bar 230, which contains various delivery options, such as High Importance, Return Receipt and other delivery options. The delivery options bar 230 provides an indication as to whether or not the originator has selected any of one or more delivery options for the new e-mail (which will be discussed further with respect to FIG. 7). The originator creates or enters or types in the message body of the new e-mail in the body section 280 of composition window 200.

Figure 3:
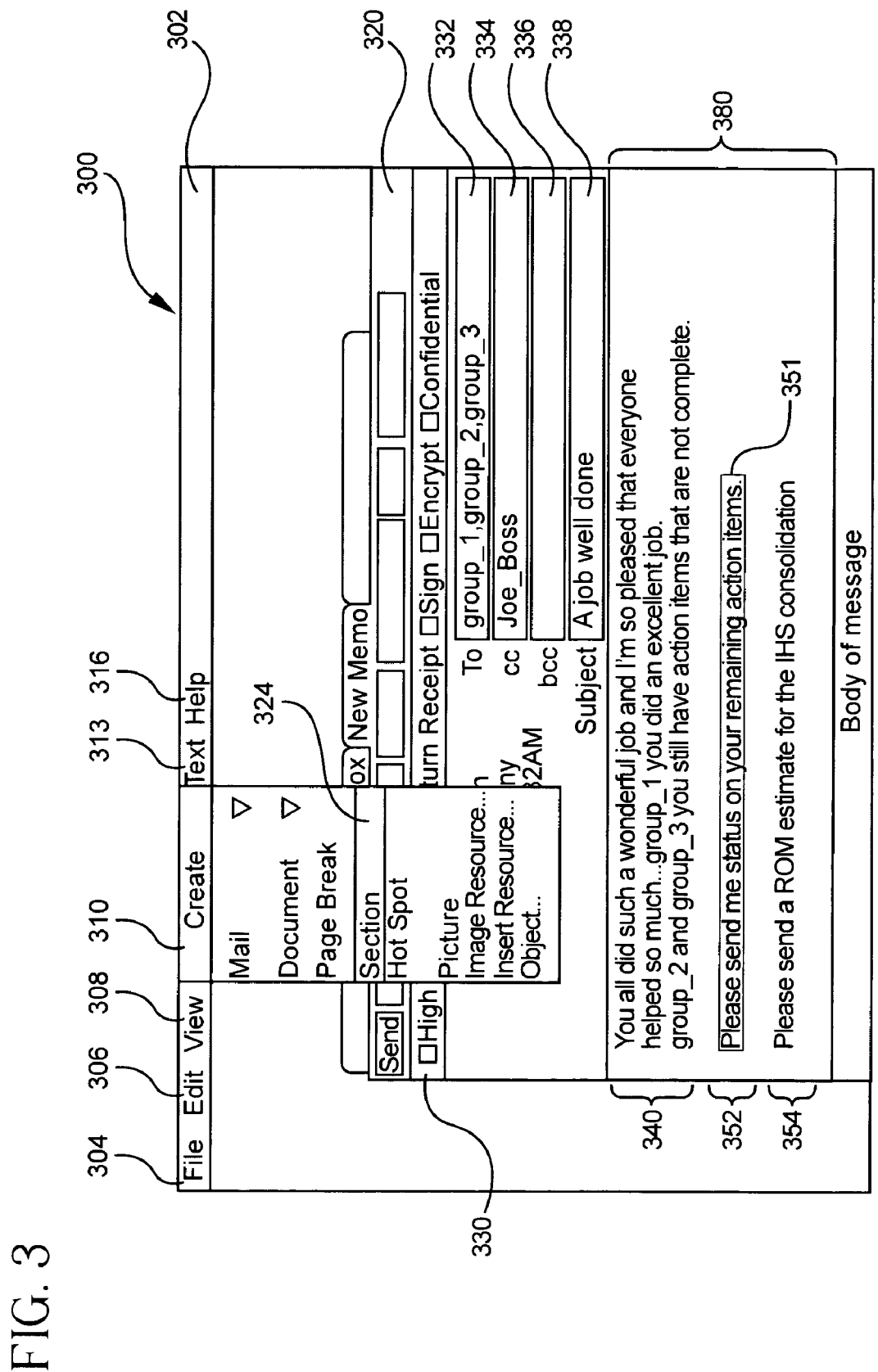
FIG. 3 is an illustration of a create menu sub-window or sub-screen which may be used for creating a response section in a new e-mail composition window or screen in an e-mail application, in accordance with an embodiment of the present invention.

Referring to FIG. 3, the e-mail composition window 300 shows that an originator specifies recipients in the To recipient group 332 and the cc recipient group 334. There are no recipients specified in the cc recipient group 336. As shown in the To recipient group 332, the originator has specified recipients that are designated as groups, instead of individuals. In particular, the originator has specified "group_1, group_2, group_3" in the To recipient group 332. Further, the originator has specified an individual "Joe_Boss" in the cc recipient group 334. Additionally, the originator has entered a title of "A job well done" in the Subject field 338. Further, as shown in FIG. 3, the originator generates or creates or composes or prepares a new e-mail in the body section 380 of the e-mail composition window 300 by entering or typing in a message.

Preferably, the originator creates a general section 340 within the body section 380 of the e-mail composition window 300 that is addressed to all the recipients in the e-mail. In a preferred embodiment, the originator creates one or more response sections, preferably, below the general section 340 of the e-mail composition window 300. Alternatively, the general section 340 can be added at the end of the e-mail message. In particular, as shown in FIG. 3, the originator has created two response sections and has typed in separate response section text messages 352 and 354 corresponding to each of the response sections that the originator wants a response to, in particular, from a subset of the recipients. As shown in FIG. 3, the general section 340 and the response section text messages 352 and 354 together comprise the new e-mail message making up the body section 380 of the e-mail composition window 300.

Figure 4B:
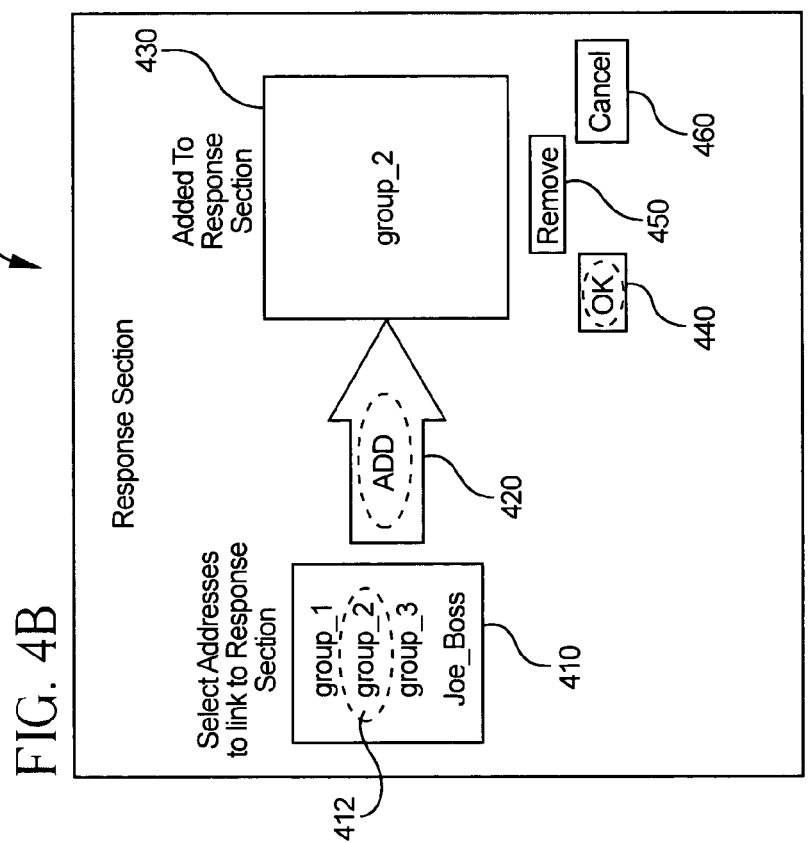
FIG. 4A-4B are illustrations of a response section sub-window or sub-screen which may be used for assigning recipients to a response section created in a new e-mail composition window or screen in an e-mail application, in accordance with an embodiment of the present invention.
Figure 4A:
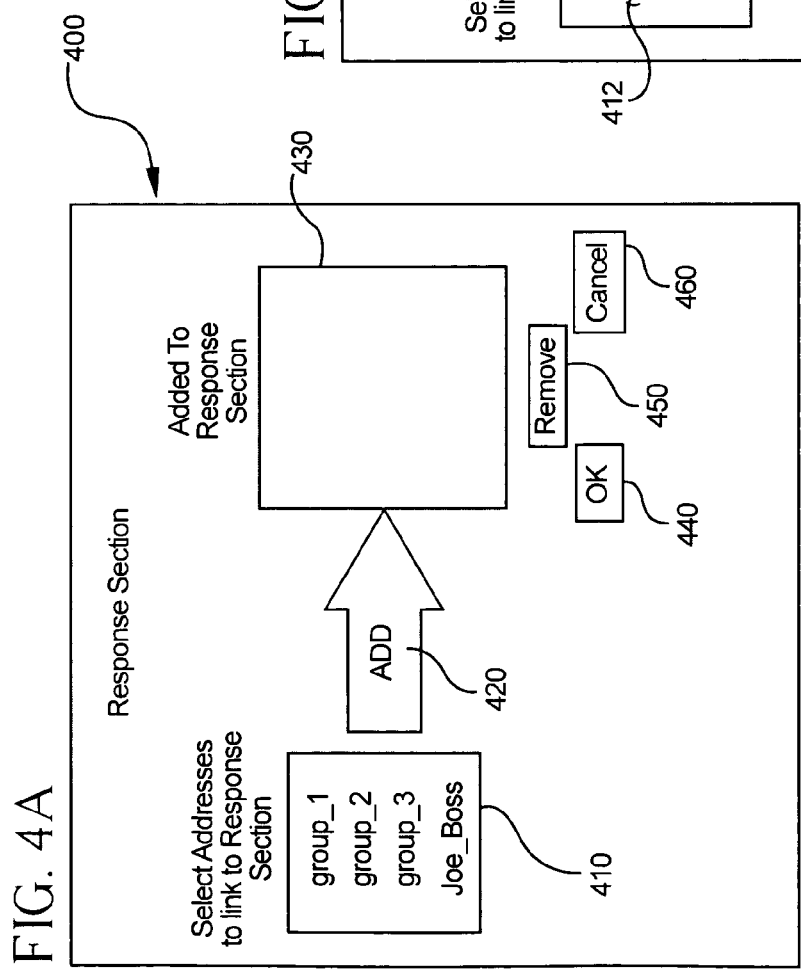

In order to create each of the respective response sections, the originator selects the response section text message, preferably, by highlighting the text. As shown in FIG. 3, the response section text message 352 is highlighted (as indicated by a box around the text, the box is referenced by the numeral 351). The originator opens, clicks, presses or selects from the main menu bar 302 at the top of the composition window 300 the menu item Create 310. In a preferred embodiment, the menu item Create 310 is a pull-down menu, which includes a sub-item called Section, designated by numeral 324 in FIG. 3. The Section 324 sub-item allows the originator to create a response section in the body section 380 of the e-mail. In particular, once the originator selects the sub-item Section 324, another screen or window pops up, as shown in FIGS. 4A and 4B. In particular, a Response Section screen or window 400 appears in the e-mail composition window (which e-mail composition window is not shown in the background for FIGS. 4A and 4B).

Referring to FIG. 4A, the "Select Addresses to link to Response Section" 410 preferably provides a list of all the recipients already specified in the e-mail as well as provides a list of other recipients from which the originator can select recipients for the Response Section 352. Preferably, the "Select Addresses to link to Response Section" is linked to a database, such that, the originator can select a name or e-mail address that is to be added to a response section. As depicted in FIG. 4A, the originator selects, preferably, by clicking on a recipient listed in the "Select Addresses to link to Response Section" 410 and adds the selected recipient to the "Added to Response Section" 430. In particular, as shown in FIG. 4B, first, the originator selects the recipient group_2 referenced by numeral 412 in the "Select Addresses to link to Response Section" 410 (where the selection of group_2 is represented by the dotted circle around group_2) and then the originator clicks or selects an Add key or button 420 (where the selection is represented by the dotted circle around the Add key or button 420), so that group_2 is added to the "Added to Response Section" 430 in FIG. 4B. If the originator desires to add another recipient, the originator clicks or selects another recipient listed in the "Select Addresses to link to Response Section" 410 and adds the selected recipient to the "Added to Response Section" 430. After the originator has added all the recipients that the originator wants a response from for the response section 352, which in FIGS. 4A and 4B is only the recipient group_2, the originator selects or clicks on the OK key or button 440 (where the selection is shown by the dotted circle around the OK key or button 440), which creates the response section 552 having a response section bar 551 (shown in FIG. 5) and contains the response section text message 352 of FIG. 3, referred to as 552 in FIG. 5.

Figure 5:
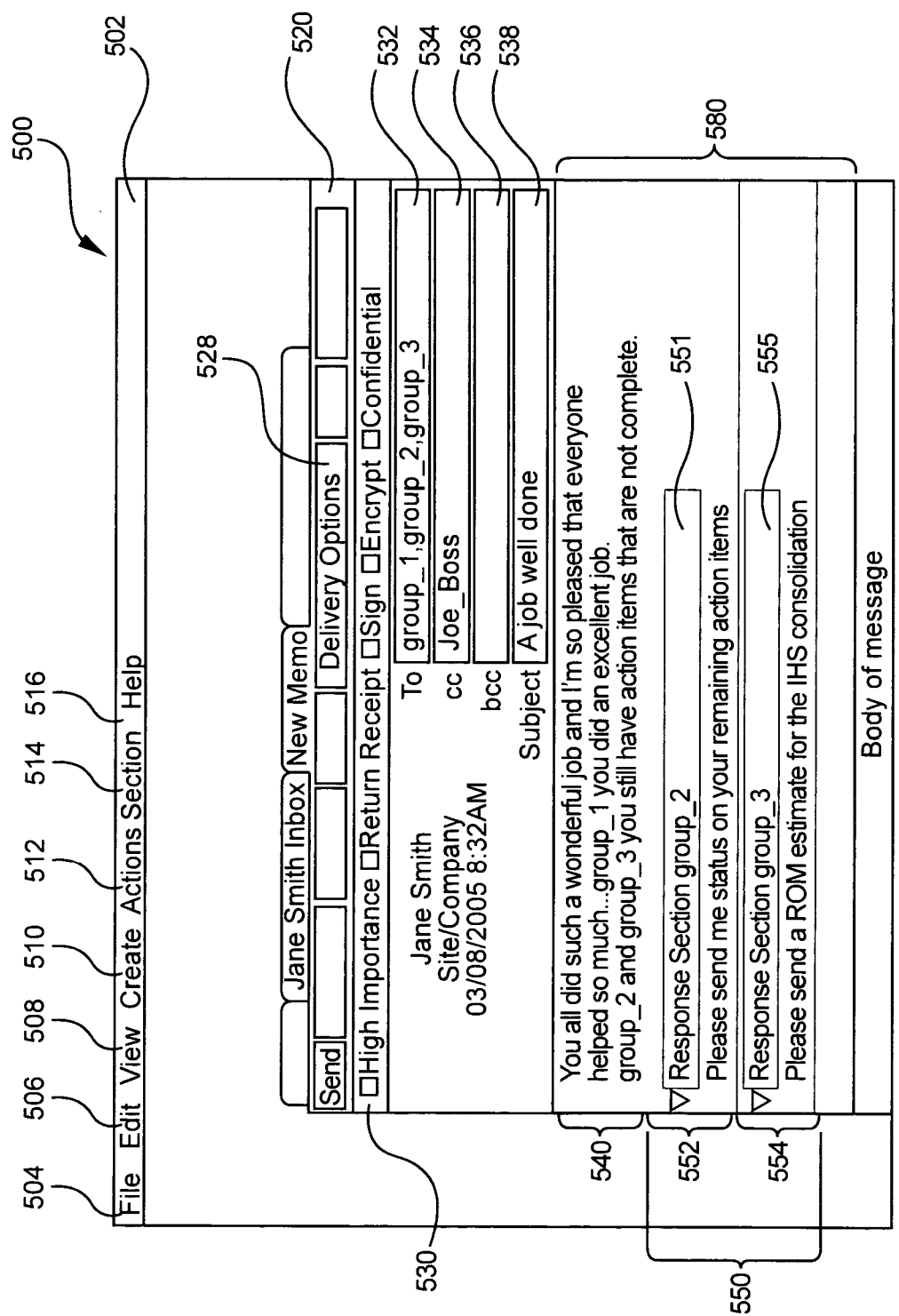
FIG. 5 is an illustration of a new e-mail composition window or screen in an e-mail application containing multiple response sections with assigned or specified recipients, in accordance with an embodiment of the present invention.

As shown in FIG. 5, the main menu bar 502 at the top now includes a menu item Section 514. If the originator desires to add another recipient after creating the response section 552, the originator can add a recipient in two ways. First, the originator can select or click on the menu item Section 514 at the top of the main menu bar 502 of the composition window 500. In a preferred embodiment, the menu item Section 514 offers a sub-menu (not specifically shown in any of the drawings). When the menu item Section 514 is clicked on or selected, a sub-menu is shown for menu item Section 514, which lists each of the Response sections created by the originator. In particular, the sub-menu for menu item Section 514 would show a sub-item for "Response Section group_2" and a sub-item for "Response Section group_3". Further, the originator selects one of the two response sections (either Response Section 552 or Response Section 554) to which a recipient should be added. If the originator clicks on "Response Section group_2", the originator will see a response section screen similar to that of the FIG. 400 shown in FIG. 4B. In a preferred embodiment, the response section screen provides a list of all the recipients specified in the e-mail as well as provides a list of other recipients in the "Select Addresses to link to Response Section" (similar to numeral 410 shown in FIG. 4B), from which the originator can select a recipient, and the "Added To Response Section" (similar to numeral 430 in FIG. 4B) of the response section screen will already have "group_2" listed. However, if the originator clicks on "Response Section group_3", the originator will see a response section screen similar to that of FIG. 400 shown in FIG. 4B, and the response section screen will provide a list of all the recipients specified in the e-mail as well as provide a list of other recipients available in the "Select Addresses to link to Response Section" (similar to that of numeral 410 shown in FIG. 4B) from which the originator can select a recipient, and the "Added To Response Section" (similar to that of numeral 430 in FIG. 4B) of the response section screen will already have "group_3" listed. In either case, in order to add another recipient, the originator selects a recipient listed in the "Select Addresses to link to Response Section" and then the originator clicks or selects the Add key or button (similar to that of numeral 420 in FIG. 4B), so that the selected recipient is added to the "Added to Response Section" (similar to the "Added to Response Section" 430 in FIG. 4B). If the originator desires to add another recipient to either Response Section 552 or Response Section 554, the originator simply repeats the process described herein above until all the recipients have been added and then the originator clicks or selects the OK button (similar to that of numeral 440 shown in FIG. 4B) in order to add the selected recipient(s) to either the Response Section 552 or the Response Section 554. Pressing or selecting the OK button takes the originator back to the composition window 500 shown in FIG. 5.

Similarly, in order to create the response section 554 shown in FIG. 5, the originator selects the response section text message 354 shown in FIG. 3, preferably, by highlighting the text. The originator then opens, clicks, presses or selects the menu item Create 310 in the menu bar 302 at the top of the composition window 300 in FIG. 3, and selects the sub-item Section, designated by numeral 324, which leads the originator to the screen shown in FIGS. 4A and 4B. The originator repeats the process of adding one or more recipients from the list provided in the "Select Addresses to link to Response Section" 410 to the "Added to Response Section" 430 by selecting the Add button 420 and then pressing or clicking on the OK button 440, so that the response section text message 354 in FIG. 3 is transformed into the response section 554 that has the response section bar 555, as shown in FIG. 5. In particular, as shown in FIG. 5, the originator has specified group_3 as the intended recipients for response section 554. As shown in FIG. 5, the response sections 552 and 554 are collectively numbered 550, which together with the general section 540 makes up the body section 580 of the e-mail shown in composition window 500.

Alternatively, the originator can add a recipient to the created "Response Section group_2" by clicking on the response section bar 551 and similarly, the originator can add a recipient to the created "Response Section group_3" by clicking on the response section bar 555. Selecting or clicking on either of the respective bars 551 and 555 brings the originator to a Response Section screen similar to FIG. 4B, where if the originator selected bar 551, the "group_2" is shown as already being a designated recipient in the "Added To Response Section" (numeral 430 in FIG. 4B) for Response Section 552 and where if the originator selected bar 555, the "group_3" is shown as already being a designated recipient in the "Added To Response Section" of the Response Section screen (shown in FIG. 4B). Again, the originator selects the recipients from the "Select Addresses to link to Response Section", clicks or selects the Add key or button to add the selected recipient to the "Added to Response Section", and then clicks on the OK button to complete the adding process to return to the e-mail composition window 500.

Figure 6:
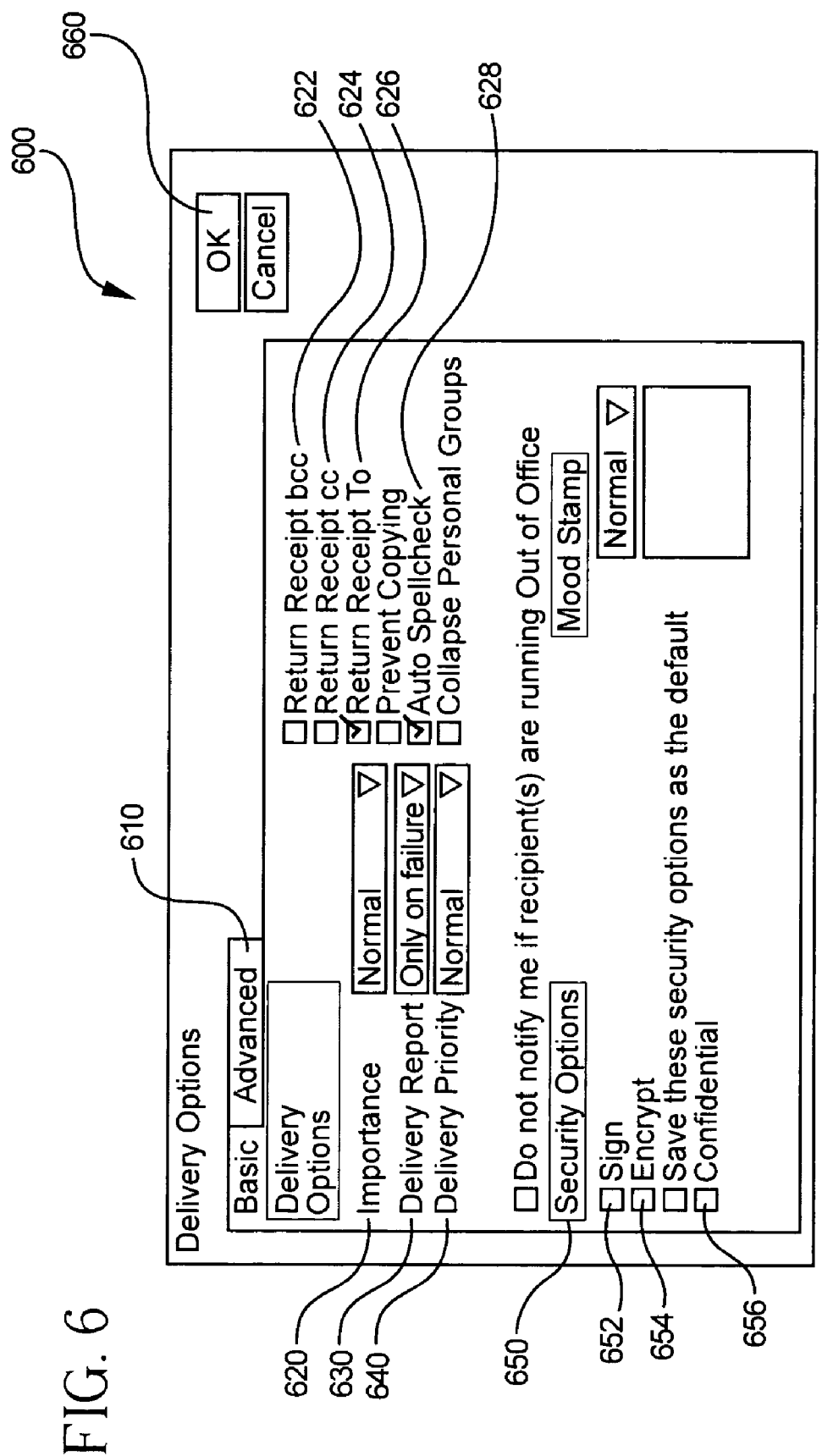
FIG. 6 is an illustration of a delivery options menu sub-window or sub-screen which may be used for defining a delivery option or return receipt for a new e-mail created in an e-mail application, in accordance with an embodiment of the present invention.
Figure 7:
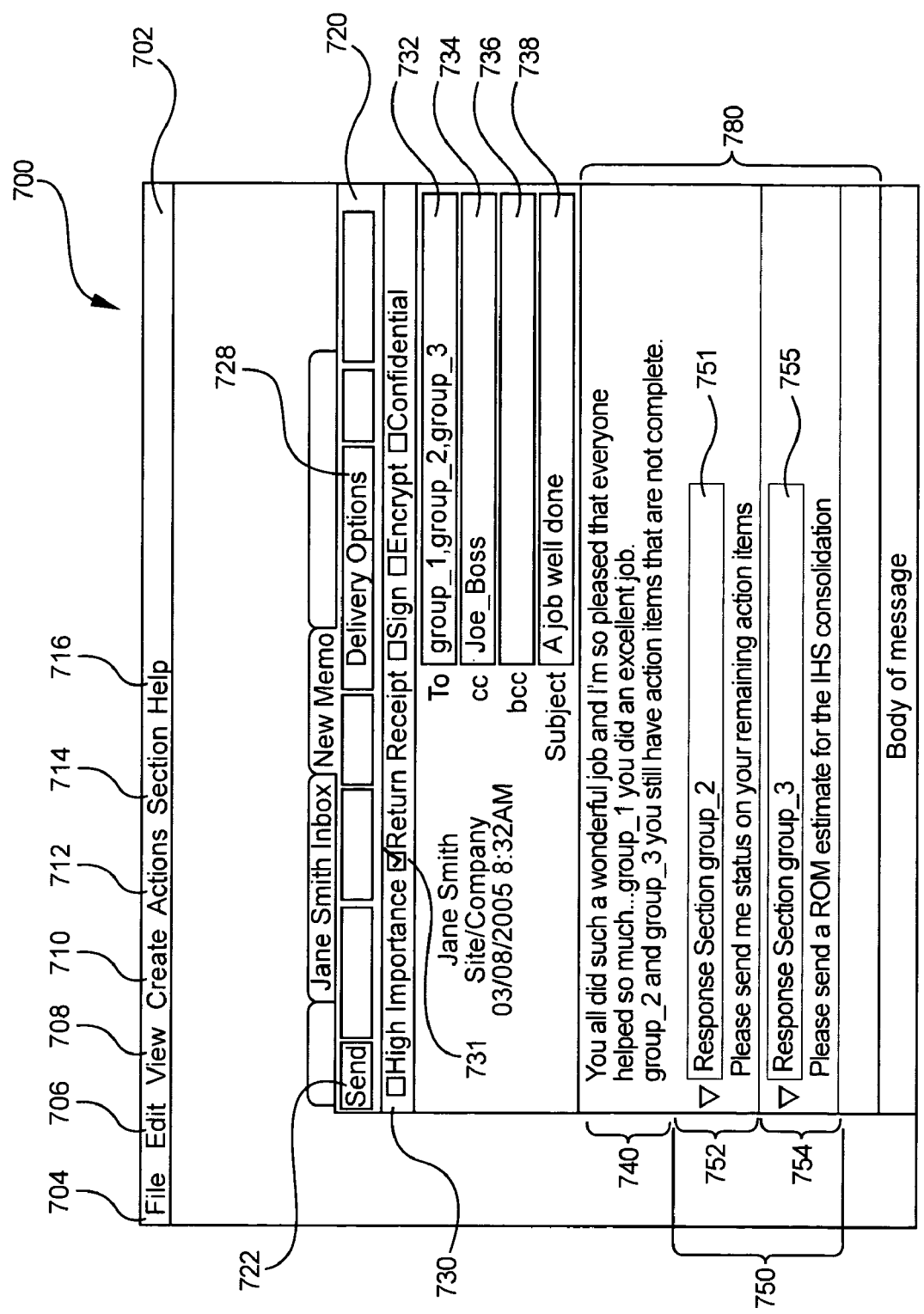
FIG. 7 is an illustration of a new e-mail composition window or screen in an e-mail application containing multiple response sections with assigned recipients and has a defined return receipt or delivery option, in accordance with an embodiment of the present invention.

In another embodiment, as illustrated generally in FIG. 1 through 9 and more particularly in FIGS. 5 through 7, the invention provides a method of requesting a return receipt from a subset of recipients of an e-mail, where the e-mail is either an original e-mail or a reply e-mail. The method comprises creating an e-mail in an e-mail composition window of an e-mail application, specifying the recipients from a plurality of recipient groups for the e-mail, selecting one or more return receipt recipients from a plurality of return receipt recipient groups for the e-mail, where the one or more return receipt recipients selected correspond to the subset of recipients, and sending the e-mail to the recipients specified, such that, the return receipt is requested from the one or more return receipt recipients selected and which correspond to the subset of recipients of the e-mail that is sent. As used herein, the term "subset of recipients" means either one, or more or all of the recipients specified in the e-mail. Preferably, the plurality of recipient groups comprises at least one of: To, cc and bcc, and wherein the plurality of return receipt recipient groups comprises at least one of: Return Receipt To, Return Receipt cc and Return Receipt bcc.

Referring to FIG. 5, preferably, the originator selects a delivery option from a plurality of delivery options for the new e-mail in the e-mail composition window 500 before sending the new e-mail. In particular, the originator selects a tab or button Delivery Options 528 from the action menu bar 520 located towards the top of the e-mail composition window 500. Selecting or clicking on the button Delivery Option 528, leads the originator to the Delivery Options screen or window 600, shown in FIG. 6. As shown in FIG. 6, in the Delivery Options window 600, the originator has many options with respect to the delivery of the new e-mail, including options for setting the level of Importance 620, Delivery Report 630, Delivery Priority 640, Return Receipt bcc 622, Return Receipt cc 624, Return Receipt To 626, Auto Spellcheck 628, and Security Options 650, which include security options designated as Sign 652, Encrypt 654 and Confidential 656. Of significance, are the delivery options for Return Receipt bcc 622, Return Receipt cc 624 and Return Receipt To 626. Preferably, the originator selects one or more of the delivery options for Return Receipt bcc 622, Return Receipt cc 624 and Return Receipt To 626. The originator can select (by clicking on the appropriate boxes or pull-down menu) one or more of these delivery options for the e-mail. As shown in FIG. 6, the originator selects as a delivery option for the new e-mail only the delivery option for Return Receipt To 626, preferably, by clicking on the box (marked with a check mark) to the left of Return Receipt To 626 and presses the OK key or button 660, which takes the originator back to the e-mail composition window, which is now shown in FIG. 7.

Referring to FIG. 7, the delivery options bar 730 shows that the box for Return Receipt 731 is marked, preferably, with a check mark, indicating that a delivery option has been selected from the Delivery Options 528 (discussed with reference to FIG. 5, however, the Delivery Options tab is designated as 728 in the e-mail composition window 700). Further, since the originator has selected the delivery option of Return Receipt To 626 in the Delivery Options window 600 of FIG. 6, this signifies that the recipients specified in the To recipient group (numeral 732 in FIG. 7) are the recipients from whom return receipts are being requested. In particular, as shown in FIG. 7, since group_1, group_2 and group_3 are the specified recipients in the To recipient group in 732, this signifies that when the new e-mail is received by each of group_1, group_2 and group_3, the originator can expect to receive a return receipt from each of group_1, group_2 and group_3, as the new e-mail is received by each of these recipients. However, the originator will not receive a return receipt from Joe_Boss, the recipient specified in the cc recipient group 734 of the e-mail composition window 700, since the originator did not select a delivery option for Return Receipt cc 624 in FIG. 6. Alternatively, the originator can skip the step of selecting a delivery option for the new e-mail, which would then revert to a default setting for a delivery option. For instance, a default setting for a delivery option can be that a return receipt is not received from any of the recipients specified in the e-mail or a default setting for a delivery option can be that a return receipt is received from all recipients specified in the e-mail. Accordingly, an originator of an e-mail can request a return receipt from a subset of recipients specified in the original e-mail, as explained hereinabove. Once the originator has either specified a delivery option (as is the case shown in FIG. 7) or has decided not to specify a delivery option and to rely on the default setting for a delivery option, the originator sends the new e-mail by clicking or pressing on the Send button or tab 722, shown towards the top left of the e-mail composition window 700. Once the new e-mail has been sent, the new e-mail is then delivered to the recipients specified in that new e-mail.

In another embodiment, the invention provides a method of responding to a received e-mail. In particular, the invention provides a method of responding to a received e-mail having a plurality of distinct sections. Preferably, the plurality of distinct sections include at least a general section and one or more response sections. The method comprises opening the received e-mail in an e-mail application, selecting in the received e-mail a distinct section from the plurality of distinct sections to respond to, generating a reply e-mail to the distinct section selected in a reply e-mail composition window containing only the distinct section selected, and sending the reply e-mail. Preferably, the generating step further includes choosing a reply option for the distinct section selected in the received e-mail. Further, in one embodiment, if the distinct section selected is a general section, the generating step further comprises generating a reply e-mail to the general section selected in the reply e-mail composition window containing only the general section selected. In another embodiment, if the distinct section selected is a response section, the generating step further comprises generating a reply e-mail to the response section selected in the reply e-mail composition window containing only the response section selected. More preferably, the method further comprises receiving one or more return receipts based on the delivery option selected in the reply e-mail. Preferably, the reply option comprises at least one of: Reply and Reply All. Further, the sending step further includes selecting a delivery option from a plurality of delivery options for the reply e-mail prior to sending the reply e-mail. Preferably, the delivery option comprises at least one of: Return Receipt To, Return Receipt cc and Return Receipt bcc.

Figure 8:
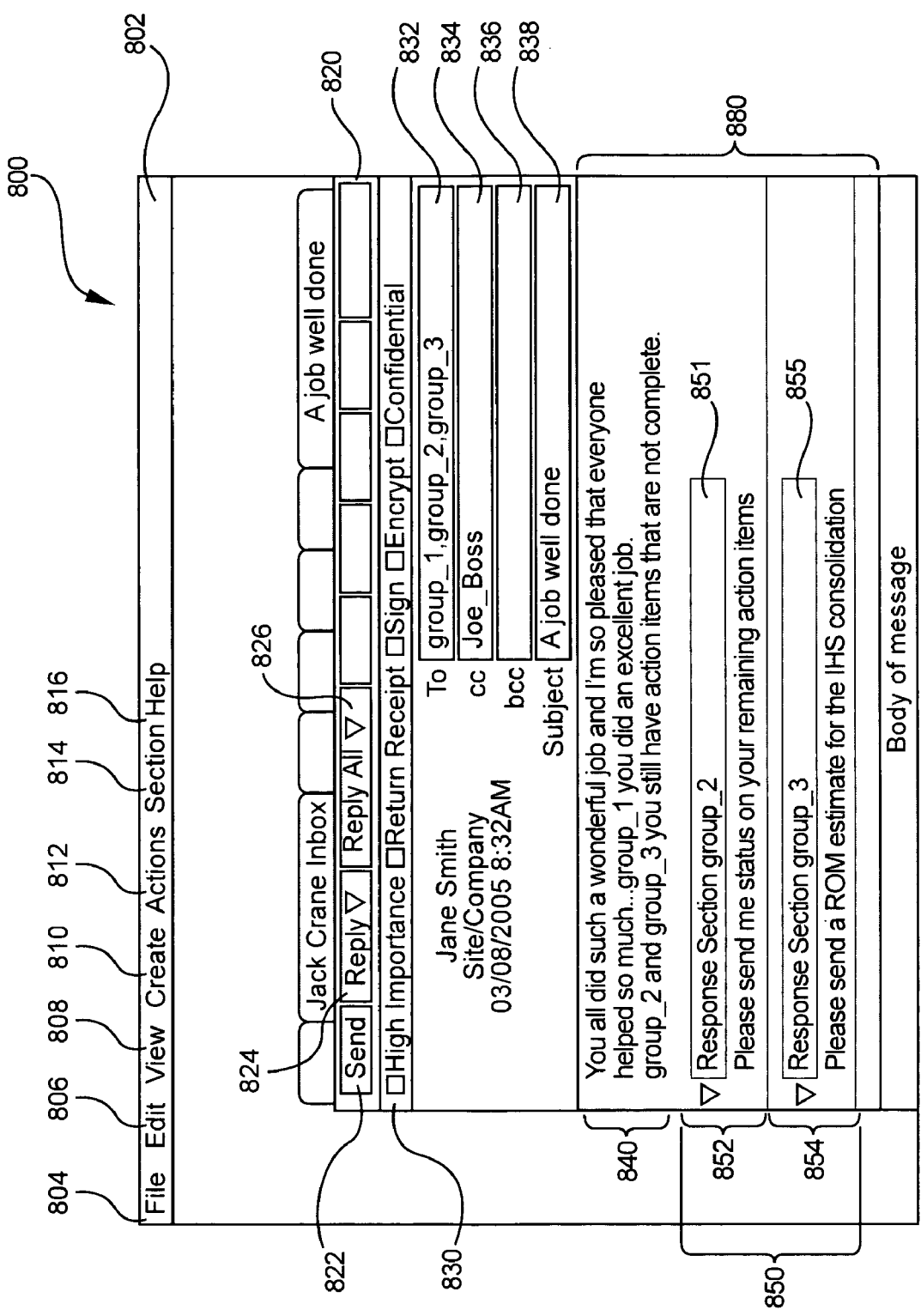
FIG. 8 is an illustration of an e-mail received in an e-mail window or screen of a recipient's e-mail application, in accordance with an embodiment of the present invention.
Figure 9:
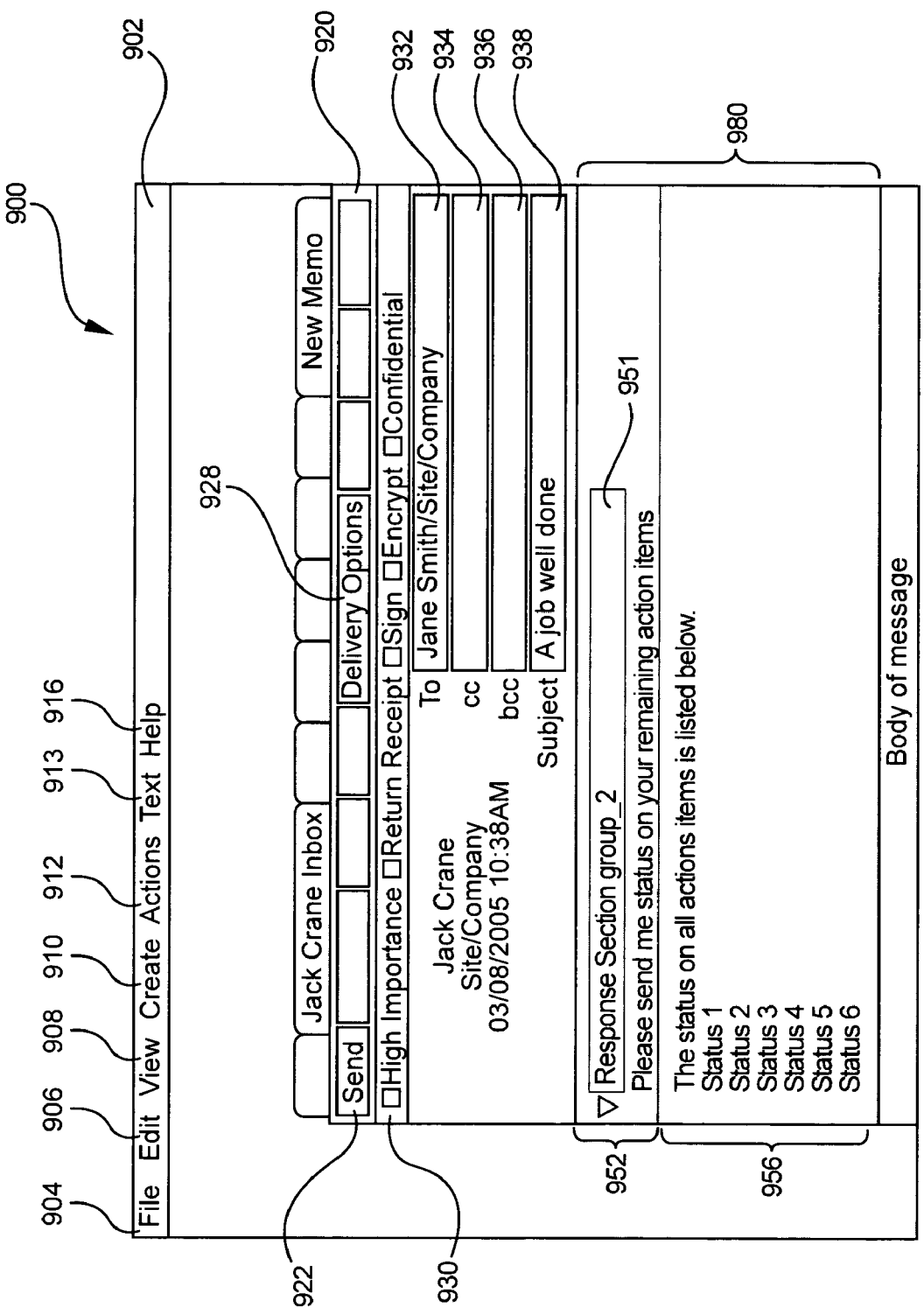
FIG. 9 is an illustration of a reply e-mail composition window or screen containing a response section of an e-mail received in a recipient's e-mail application, in accordance with an embodiment of the present invention.

Reference is now made to FIGS. 7 through 9 and more particularly with respect to FIGS. 8 and 9, which illustrate a method of responding to a received e-mail, in accordance with an embodiment of the invention. In particular, FIGS. 8 and 9 illustrate a method of responding to a received e-mail that contains one or more distinct sections, that is, preferably, contains a general section and, more preferably, contains one or more response sections in addition to a general section. When a recipient specified in an original e-mail receives the original e-mail in the recipient's inbox, the recipient sees the general section, if any, and the response sections, if any, sent by the originator in the body section of the received email. Turning to the e-mail in FIG. 7, the originator has specified recipients group_1, group_2 and group_3 in the To recipient group in 732, and the originator has specified recipient Joe_Boss in the cc recipient group in 734. As such, turning to FIG. 8, a recipient specified either in the To recipient group or in the cc recipient group of the original e-mail who opens the e-mail will see the entire original e-mail, as shown in the recipient's e-mail window 800 in FIG. 8. In particular, the recipient, in this case, Jack Crane, sees the general section 840 as well as the response sections 852 and 854, as created in the original e-mail that was sent. Additionally, the recipient sees the name of the originator (Jane Smith) of the received e-mail in the left portion of the recipient's e-mail, the subject matter of the original e-mail in the Subject 838 field and the recipients specified by the originator in the To recipient group 832, the cc recipient group 834, if any, and the bcc recipient group 836, if any. Further, the recipient's e-mail composition window 800 has a different action menu bar 820, which contains the action item button for Send 822, a button for Reply 824 and a button for Reply All 826.

In particular, as shown in FIG. 8, the recipient Jack Crane can be either one of the group_1, group_2 or group_3 recipients specified or identified in the original e-mail. Regardless of whether Jack Crane is a recipient of group_1, group_2 or group_3, preferably, the recipient Jack Crane can choose to reply to: only the originator of the e-mail, only to the recipients identified or selected in group_1, only to the recipients identified or selected in group_2, only to the recipients identified or selected in group_3, to both the originator and all recipients identified or selected in group_1, to both the originator and all recipients identified or selected in group_2, to both the originator and all recipients identified or selected in group_3, the recipients identified or selected in the cc recipient group, if any, the recipients identified in the bcc recipient group, if any, or to everyone identified in the e-mail. More preferably, Jack Crane can further specify additional recipients in the To recipient group, the cc recipient group and/or the bcc recipient group of the reply e-mail composition window (as explained herein below). In a preferred embodiment, the button for Reply 824, comprises a pull-down menu, which provides several standard options for the recipient, such as, reply with attachments, but which also include options for the following sub-items: "To recipient group", "group_1", "group_2", "group_3", "To recipient group and group_1", "To recipient group and group_2", "To recipient group and group_3", "cc recipient group", if any in the original e-mail, and "bcc recipient group", if any in the original e-mail.

In particular, if Jack Crane is a recipient of group_2 and chooses only to reply to the originator Jane Smith regarding the response section 852 directed to group_2, then the recipient Jack Crane (hereinafter referred to as a replier) clicks on the button for Reply 824 and selects the sub-item "To recipient group" (not shown in any of the drawings) in the pull-down menu for the button Reply 824 shown on the top left portion of the e-mail window 800. Clicking or selecting the Reply 824 button takes the replier to a reply e-mail composition window 900 shown in FIG. 9. The reply e-mail composition window 900 preferably contains the name of the originator that sent the original e-mail, namely, Jane Smith, in the To recipient group 932, so that the reply e-mail can be sent to the originator. However, the replier can choose to add additional recipients in any of the To recipient group 932, the cc recipient group 934 and the bcc recipient group 936 (not shown in FIG. 9) by adding the recipient's name or e-mail address into any of the To, cc and/or bcc recipient groups. Further, the reply e-mail composition window 900 also contains a copy of the response section 852 (including the response section bar 851) received in the recipient's e-mail window 800, given that the replier is a response section replier, that is, one of the recipients identified in the response section 852 intended for group_2, which response section is now referred to by the numeral 952 and which response section bar is now referred to by the numeral 951, in FIG. 9. The automatic copying of the response section 952 in the reply e-mail composition window 900 facilitates replying to the original response section 852 without having to copy the original response section in the reply e-mail composition window 900. Accordingly, the replier is ready to generate or create a reply e-mail in the body section 980 of the reply e-mail composition window 900. Preferably, the replier to the response section 852 enters or types in the reply e-mail underneath the copy of the response section 952, as shown by the reply message 956 in the composition window 900. Similarly, if the replier is a recipient in group_3, the replier can reply to the response section 854 by selecting either a reply option of Reply 824 or Reply All 826, such that, the response section 854 (including the response section bar 855) is automatically copied into the body section 980 of the reply e-mail composition window 900. Further, the replier can add any additional recipients not identified in the original e-mail by adding the recipient's name or e-mail address into any of the To 932, cc 934 or bcc 936 recipient groups, shown in FIG. 9. Accordingly, when the originator of the e-mail, receives a reply e-mail from any recipient in group_2 or group_3, the originator will see both the original response section that was created (with the response section bar at the top, for instance, the bar 951 for response section 952, as shown in FIG. 9) and an appropriate reply (such as, the text 956 in FIG. 9) to the respective response section (for instance, response section 952 in FIG. 9) in the received reply.

On the other hand, if the replier is a recipient in group_1, that is, a non-response section replier who does not have any response sections assigned in the original e-mail that is received, the group_1 replier can still choose to reply to any general section message sent in the original e-mail by selecting a reply option of either Reply or Reply All, such that, the general section in the original e-mail is copied into the body section of a reply e-mail composition window. Accordingly, when the originator of the e-mail receives the reply e-mail from any recipient in group_1, the originator will see both the original general section and an appropriate response to the general section in the received reply. For instance, referring to FIG. 8, a non-response section replier can select a reply option of either Reply 824 or Reply All 826, similar to a recipient identified in a response section replying to a response section described hereinabove, such that, the general section 840 is automatically copied into the body section 980 of the reply e-mail composition window 900 (not shown in FIG. 9). Preferably, the non-response section replier is unable to send a reply to the originator in the same format as a response section replier, in that the non-response section replier cannot copy into a reply e-mail composition window any of the original response sections created by the originator, but can type the text of a response section into a reply e-mail composition window 900. However, when the reply e-mail is received by the originator, the e-mail will not contain the original response section created (that is, with the response section bar at the top), so that the originator will know that the replier is a non-response section replier.

Furthermore, preferably, the replier (either replying to a response section or a general section) also selects a delivery option from a plurality of delivery options for the reply e-mail in the reply e-mail composition window 900 before sending the reply e-mail. In particular, the replier selects a tab or button for Delivery Options 928 from the action menu bar 920 located towards the top of the reply e-mail composition window 900. Selecting or clicking on the button Delivery Options 928, leads the replier to a Delivery Options screen or window that is identical to the Delivery Options window shown in FIG. 6. Referring to FIG. 6, in the Delivery Options window 600, again, the replier has many options with respect to the delivery of the reply e-mail, including options for setting the level of Importance 620, Delivery Report 630, Delivery Priority 640, Return Receipt bcc 622, Return Receipt cc 624, Return Receipt To 626, Auto Spellcheck 628, and Security Options 650, which include security options designated as Sign 652, Encrypt 654 and Confidential 656. Preferably, the replier selects one or more of these delivery options, as well as, one or more of the delivery options for Return Receipt bcc 622, Return Receipt cc 624 and Return Receipt To 626. Once the replier has selected one or more delivery options for the reply e-mail, then, the replier presses the OK key or button 660, which takes the replier back to the reply e-mail composition window 900 in FIG. 9. Alternatively, the replier may decide not to select any delivery options for the reply e-mail. In either case, once the replier is finished with the reply e-mail, the replier sends the reply e-mail by clicking or pressing on the Send button or tab 922, shown towards the top left of the reply e-mail composition window 900 in FIG. 9.

Further yet, in another embodiment, the invention provides a system that comprises a computer terminal or an equivalent device, a computer readable storage media or more preferably, a programmable media containing programmable software in a form that is executable by a computer system to prepare and reply to multi-party e-mails. The programmable software comprises opening an e-mail composition window in an e-mail application for the e-mail and specifying one or more recipients from a plurality of recipient groups for the e-mail. The programmable software further comprises creating one or more response sections in the e-mail, identifying one or more recipients for each of the response sections created, selecting one or more return receipt recipients from a plurality of return receipt recipient groups for the e-mail and sending the e-mail. The programmable software further comprises receiving the e-mail in an e-mail application, selecting one of the response sections in the e-mail received, generating a reply e-mail to the response section selected in a reply e-mail composition window containing only the response section selected and sending the reply e-mail. Preferably, the sending step includes choosing a reply option for the response section selected in the received e-mail. In one embodiment, the reply option comprises at least one of: Reply and Reply All. Further, preferably, the plurality of recipient groups for the e-mail comprises at least one of: To, cc and bcc, and preferably the return receipt recipient groups comprises at least one of: Return Receipt To, Return Receipt cc and Return Receipt bcc. Preferably, a user uses a computer terminal or an equivalent device for accessing an e-mail application and an input device, such as a keyboard for performing any or all of the functions carried out by the system for preparing and replying to the e-mails.

Figure 10:
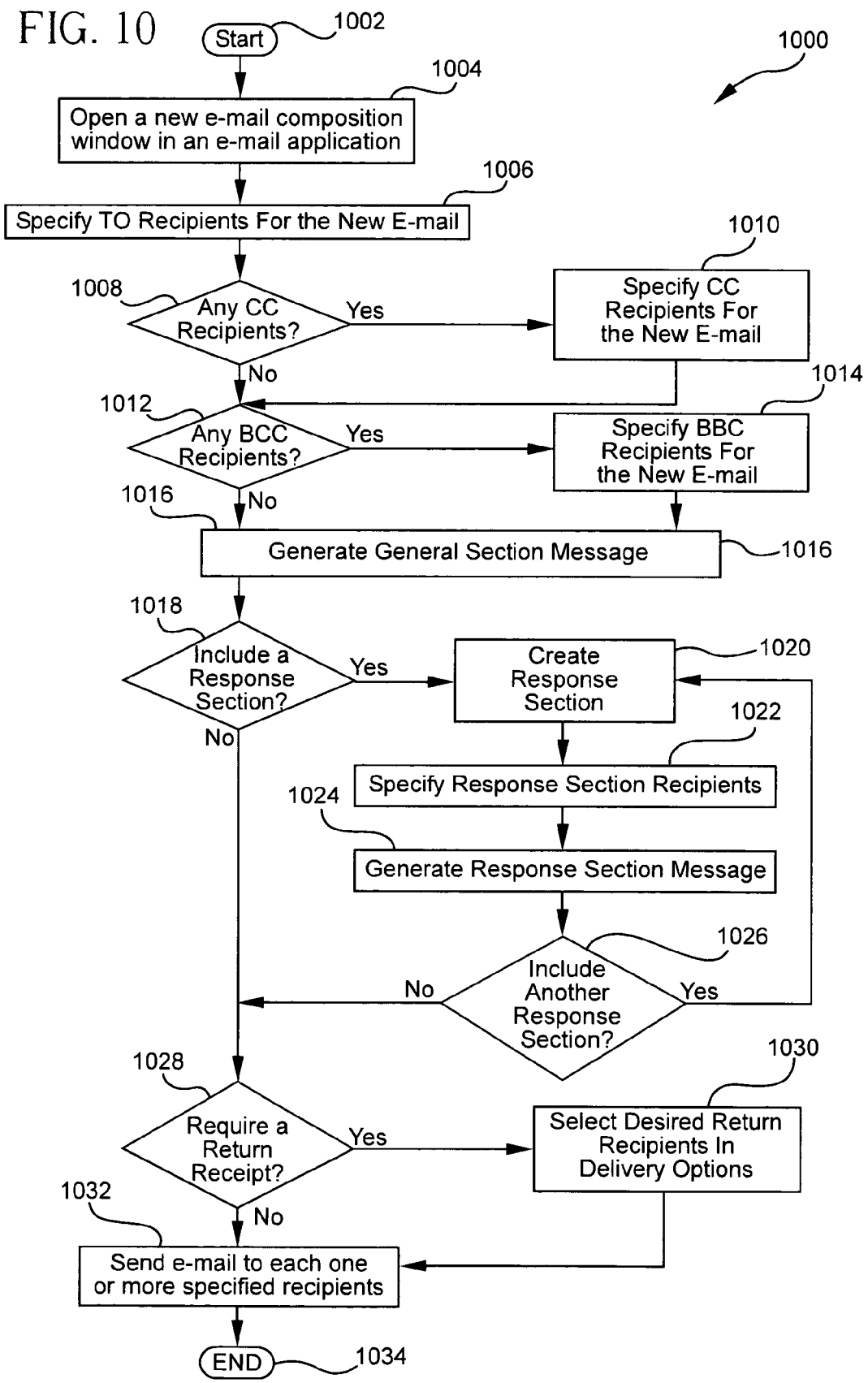
FIG. 10 is an illustration of a flowchart depicting a method of preparing a new e-mail in an e-mail application containing one or more response sections with identified recipients, in accordance with an embodiment of the present invention.
Figure 11:
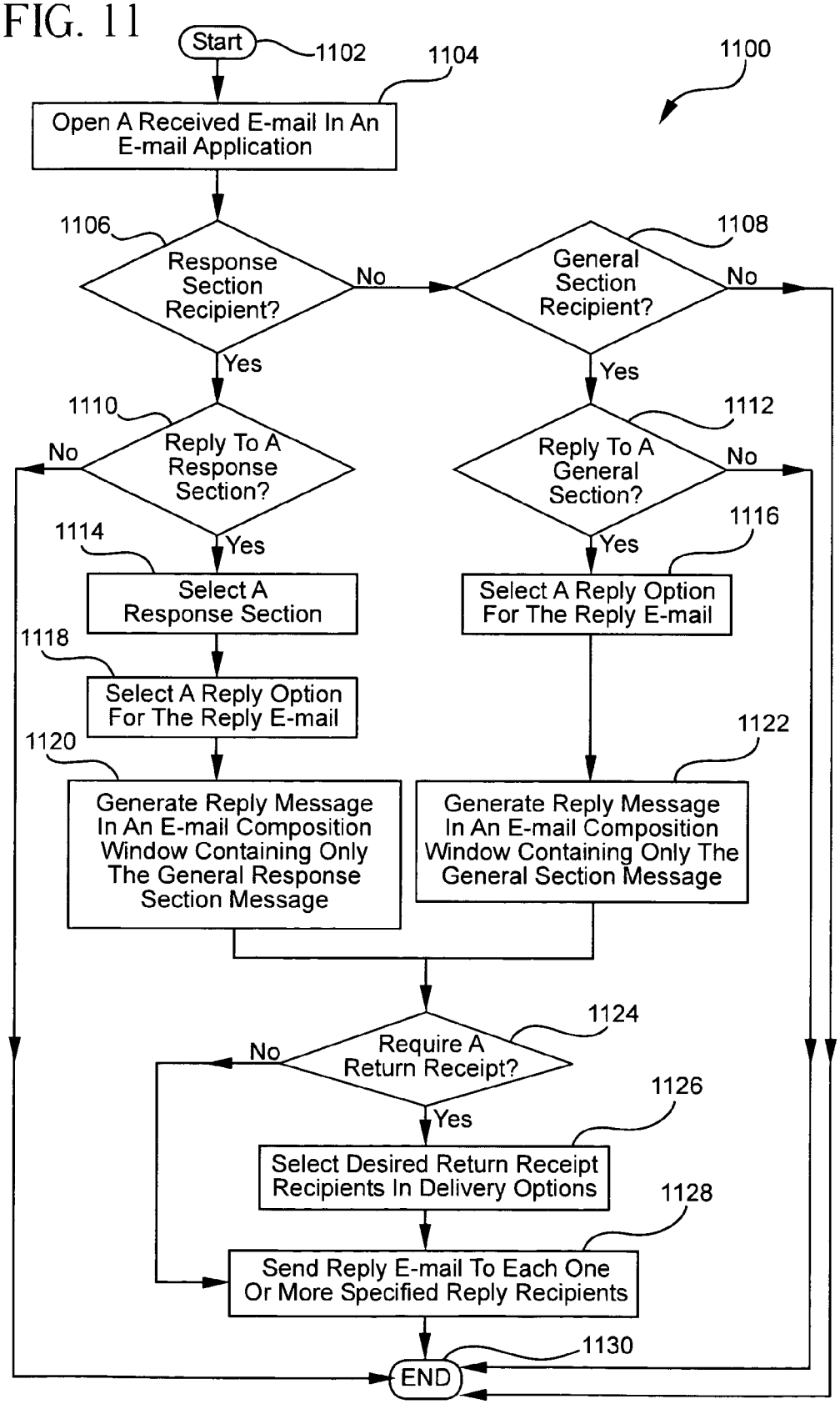
FIG. 11 is an illustration of a flowchart depicting a method of replying to a new e-mail received in a recipient's e-mail application and containing one or more response sections for a recipient, in accordance with an embodiment of the present invention.

Reference is now made to FIGS. 10 and 11. FIG. 10 illustrates a flowchart depicting a method of preparing or creating a new e-mail containing one or more response sections having specified or identified recipients, in accordance with an embodiment of the invention. The method comprises with the user opening in step 1004 a new e-mail composition window in an e-mail application and specifying in step 1006 the To Recipients for the new e-mail. Further, if there are any cc recipients to be added in step 1008, the user specifies cc recipients for the new e-mail in step 1010, which takes the user to step 1012. If there are no cc recipients to be added in step 1008, the user determines if there are any bcc recipients to be added in step 1012, and if so, the bcc recipient group recipients are added to the new e-mail in step 1014. Preferably, the user then generates a general section message in step 1016. The user then determines whether or not the user wants to create or include a response section in step 1018. If the user wants to create a response section in step 1018, the user then proceeds to create a response section in 1020. The user specifies recipients for the response section in step 1022 and generates or creates the response section in step 1024. Turning to step 1026, if the user wants to create or include another response section in step 1026, the user repeats the process starting at step 1020 by creating another response section, until the user is ready to decide whether or not to request or require a return receipt in step 1028. However, if at step 1018, the user decides not to create or include a response section, the user determines if a return receipt is required in step 1028. So regardless of whether or not the user creates a response section, the user determines whether a return receipt is required in 1028. If a return receipt is required, the user selects the recipients for the return receipt in the delivery options screen (discussed with reference to FIG. 6) in step 1030 for the new e-mail and then sends the e-mail in step 1032. If a return receipt is not required in step 1028, the user sends the e-mail in step 1032, which ends the process. However, in an alternative embodiment (not shown in FIG. 10), the user may skip creating a general section in step 1016 and instead only decide to create one or more response sections in the e-mail.

FIG. 11 illustrates a flowchart depicting a method of replying to a new e-mail received in a recipient's e-mail application that contains one or more response sections for a recipient, in accordance with an embodiment of the invention. As shown in FIG. 11, the method begins with a recipient opening a received e-mail in an e-mail application in step 1104. The recipient determines in step 1106 if the recipient is a response section recipient, that is, if there is a response section that is directed to the user, and if so, whether to reply to the response section in step 1110. If there is no response section that is directed to the user, the user then determines in step 1108 whether the user is a non-response section recipient or a general section recipient in step 1108, and if so, whether the user wants to respond to the general section in step 1112. If the user decides to reply to the general section in step 1112, then the user selects a reply option for the reply e-mail in step 1116 and generates in step 1122 a reply message in an e-mail composition window containing only the general section message. However, if at step 1106, the user is a recipient of a response section, then the user decides whether or not the user wishes to reply to the response section in step 1110. If the user decides to reply to the response section, the user selects the response section in step 1114, and then selects a reply option for the reply e-mail in step 1118. The user then generates in step 1120 a reply message in an e-mail composition window containing only the response section message. Steps 1120 and 1122 lead to step 1124, where the user determines whether a return receipt is required for the reply e-mail. If no return receipt is required in step 1124, the user sends the e-mail in step 1128. However, if a return receipt is required in step 1124, the user selects the return receipt recipients in the delivery options menu in step 1126 and then sends the e-mail in step 1128, which completes the process.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

We claim:

1. A method of processing an e-mail, said method comprising:
    opening an e-mail composition window in an e-mail application for generating a new e-mail, said composition window comprising a menu bar;
    creating a general message in a body section in the composition window;
    specifying a plurality of recipients from a plurality of recipient groups for the new e-mail;
    creating a first message in a first response section in the new e-mail;
    identifying at least one first recipient for the first response section, wherein the plurality of recipients consists of the at least one first recipient and one or more other recipients; and
    sending the new e-mail generated to each recipient of the plurality of recipients, wherein the general message and the first response section in the new e-mail are displayed to each recipient of the plurality of recipients, and wherein only the at least one first recipient may reply to the first message.

2. The method of claim 1, said method further comprising:
    creating a second message in a second response section in the new e-mail;
    identifying at least one second recipient for the second response section, wherein the one or more other recipients consist of the at least one second recipient and at least one other recipient, wherein the second response section in the new e-mail is displayed to each recipient of the plurality of recipients, and wherein only the at least one second recipient may reply to the second message.

3. The method of claim 1, wherein said creating the first message in the first response section and said identifying at least one first recipient comprises:
  selecting first text consisting of the first message by highlighting the first text;
  after said selecting first text, selecting a Create icon in the menu bar in the composition window, which results in a display of a pull-down menu that includes a Section sub-item;
  selecting the Section sub-item from the pull-down menu, which results in a display of a Response Section window that includes a first section, a second section, and an Add button, wherein the first section includes a list of potential recipients;
  selecting each recipient of the at least one first recipient from the list of potential recipients in the first section; and
  adding each selected recipient to the second section by clicking the Add button for each selected recipient.

4. The method of claim 1,
  wherein before both said creating the first message in the first response section and said identifying at least one first recipient, the menu bar in the composition window comprises icons, wherein a totality of icons in the menu bar consists of a File icon, an Edit icon, a View icon, the Create icon, an Actions icon, and a Help icon; and
  wherein after both said creating the first message in the first response section and said identifying at least one first recipient, the method further comprises adding a Section icon to the icons in the menu bar in the composition window.

5. The method of claim 1, said method further comprising:
  selecting a delivery option for the new e-mail from a plurality of delivery options displayed in a Delivery Options window, wherein the plurality of delivery options displayed in the Delivery Options window comprise a Level Of Importance, a Delivery Report, a Delivery Priority, a Return Receipt bcc, a Return Receipt cc, a Return Receipt To, an Auto Spellcheck, a Security Option Sign, a Security Option Encrypt, and a Security Option Confidential.

6. Programmable media comprising a computer readable physically tangible storage device, said storage device containing software which upon being executed by a computer system implement a method of processing an e-mail, said method comprising:
  opening an e-mail composition window in an e-mail application for generating a new e-mail, said composition window comprising a menu bar;
  creating a general message in a body section in the composition window;
  specifying a plurality of recipients from a plurality of recipient groups for the new e-mail;
  creating a first message in a first response section in the new e-mail;
  identifying at least one first recipient for the first response section, wherein the plurality of recipients consists of the at least one first recipient and one or more other recipients; and
  sending the new e-mail generated to each recipient of the plurality of recipients, wherein the general message and the first response section in the new e-mail are displayed to each recipient of the plurality of recipients, and wherein only the at least one first recipient may reply to the first message.

7. The programmable media of claim 6, said method further comprising:
  creating a second message in a second response section in the new e-mail;
  identifying at least one second recipient for the second response section, wherein the one or more other recipients consist of the at least one second recipient and at least one other recipient, wherein the second response section in the new e-mail is displayed to each recipient of the plurality of recipients, and wherein only the at least one second recipient may reply to the second message.

8. The programmable media of claim 6, wherein said creating the first message in the first response section and said identifying at least one first recipient comprises:
  selecting first text consisting of the first message by highlighting the first text;
  after said selecting first text, selecting a Create icon in the menu bar in the composition window, which results in a display of a pull-down menu that includes a Section sub-item;
  selecting the Section sub-item from the pull-down menu, which results in a display of a Response Section window that includes a first section, a second section, and an Add button, wherein the first section includes a list of potential recipients;
  selecting each recipient of the at least one first recipient from the list of potential recipients in the first section; and
  adding each selected recipient to the second section by clicking the Add button for each selected recipient.

9. The programmable media of claim 6,
  wherein before both said creating the first message in the first response section and said identifying at least one first recipient, the menu bar in the composition window comprises icons, wherein a totality of icons in the menu bar consists of a File icon, an Edit icon, a View icon, the Create icon, an Actions icon, and a Help icon; and
  wherein after both said creating the first message in the first response section and said identifying at least one first recipient, the method further comprises adding a Section icon to the icons in the menu bar in the composition window.

10. The programmable media of claim 6, said method further comprising:
  selecting a delivery option for the new e-mail from a plurality of delivery options displayed in a Delivery Options window, wherein the plurality of delivery options displayed in the Delivery Options window comprise a Level Of Importance, a Delivery Report, a Delivery Priority, a Return Receipt bcc, a Return Receipt cc, a Return Receipt To, an Auto Spellcheck, a Security Option Sign, a Security Option Encrypt, and a Security Option Confidential.

11. A system comprising a computer system and a computer readable storage device, said storage device containing software which upon being executed by a computer system implement a method of processing an e-mail, said method comprising:
  opening an e-mail composition window in an e-mail application for generating a new e-mail, said composition window comprising a menu bar;
  creating a general message in a body section in the composition window;
  specifying a plurality of recipients from a plurality of recipient groups for the new e-mail;
  creating a first message in a first response section in the new e-mail;

identifying at least one first recipient for the first response section, wherein the plurality of recipients consists of the at least one first recipient and one or more other recipients; and sending the new e-mail generated to each recipient of the plurality of recipients, wherein the general message and the first response section in the new e-mail are displayed to each recipient of the plurality of recipients, and wherein only the at least one first recipient may reply to the first message.

12. The system of claim 11, said method further comprising:

creating a second message in a second response section in the new e-mail;

identifying at least one second recipient for the second response section, wherein the one or more other recipients consist of the at least one second recipient and at least one other recipient, wherein the second response section in the new e-mail is displayed to each recipient of the plurality of recipients, and wherein only the at least one second recipient may reply to the second message.

13. The system of claim 11, wherein said creating the first message in the first response section and said identifying at least one first recipient comprises:

selecting first text consisting of the first message by highlighting the first text;

after said selecting first text, selecting a Create icon in the menu bar in the composition window, which results in a display of a pull-down menu that includes a Section sub-item;

selecting the Section sub-item from the pull-down menu, which results in a display of a Response Section window that includes a first section, a second section, and an Add button, wherein the first section includes a list of potential recipients;

selecting each recipient of the at least one first recipient from the list of potential recipients in the first section; and adding each selected recipient to the second section by clicking the Add button for each selected recipient.

14. The system of claim 11, wherein before both said creating the first message in the first response section and said identifying at least one first recipient, the menu bar in the composition window comprises icons, wherein a totality of icons in the menu bar consists of a File icon, an Edit icon, a View icon, the Create icon, an Actions icon, and a Help icon; and wherein after both said creating the first message in the first response section and said identifying at least one first recipient, the method further comprises adding a Section icon to the icons in the menu bar in the composition window.

15. The system of claim 11, said method further comprising:

selecting a delivery option for the new e-mail from a plurality of delivery options displayed in a Delivery Options window, wherein the plurality of delivery options displayed in the Delivery Options window comprise a Level Of Importance, a Delivery Report, a Delivery Priority, a Return Receipt bcc, a Return Receipt cc, a Return Receipt To, an Auto Spellcheck, a Security Option Sign, a Security Option Encrypt, and a Security Option Confidential.

16. A method of responding to a received e-mail having a plurality of distinct sections, said method comprising:

opening the received e-mail in a recipient e-mail window at a computer device of an intended recipient that received the e-mail in an e-mail application, wherein the received email has been sent by a sender to a plurality of recipients consisting of at least one first recipient, at least one second recipient, and at least one other recipient, wherein the at least one first recipient comprises the intended recipient, wherein the plurality of distinct sections comprises a first distinct section having a first message therein and a second distinct section having a second message therein, wherein the received email comprises a general message, the first distinct section, and the second distinct section, wherein the received email is characterized by the general message, the first distinct section, and the second distinct section being displayable to each recipient of the plurality of recipients, wherein the received email is characterized by the at least one first recipient being identified for the first message subject to a first constraint of only the at least one first recipient being able to reply to the first message, and wherein the received email is characterized by the at least one second recipient being identified for the second message subject to a second constraint of only the at least one second recipient being able to reply to the second message;

displaying the general message, the first distinct section, and the second distinct section in the recipient e-mail window at the computer device of the intended recipient;

generating a reply e-mail message in a reply e-mail composition window at the computer device of the intended recipient, wherein the reply e-mail message is in response to the first message and cannot be in response to the second message due to the second constraint; and sending a reply e-mail from the e-mail composition window at the computer device of the intended recipient to the sender that had sent the received e-mail to the plurality of recipients, said reply e-mail comprising the reply e-mail message.

17. The method of claim 16, wherein said generating the reply e-mail message comprises:

selecting a Reply button in the recipient e-mail window, which results in a display of the reply e-mail composition window that includes first distinct section comprising the first message; and generating the reply e-mail message beneath the first distinct section.

18. The method of claim 16, wherein the recipient e-mail window comprises a menu bar comprising icons wherein a totality of icons in the menu bar consists of a File icon, an Edit icon, a View icon, a Create icon, an Actions icon, a Section icon, and a Help icon; and wherein the reply e-mail composition window comprises a menu bar comprising icons consisting of the File icon, the Edit icon, the View icon, the Create icon, the Actions icon, a Text icon, and the Help icon.

19. The method of claim 16, said method further comprising:

selecting a delivery option for the reply e-mail from a plurality of delivery options displayed in a Delivery Options window, wherein the plurality of delivery options displayed in the Delivery Options window comprise a Level Of Importance, a Delivery Report, a Delivery Priority, a Return Receipt bcc, Return Receipt cc, a Return Receipt To, an Auto Spellcheck, a Security Option Sign, a Security Option Encrypt, and a Security Option Confidential.

* * * * *